United States Patent [19]
Ben-Tovim

[11] 3,881,812
[45] May 6, 1975

[54] MANUALLY HELD INDIRECT OPHTHALMOSCOPE ESPECIALLY ADAPTED FOR VIEWING THE PERIPHERY OF THE FUNDUS OCULI

[76] Inventor: Nathan Ben-Tovim, 16, Pney-Hagiva St., Ramath Gan, Israel

[22] Filed: Mar. 13, 1972

[21] Appl. No.: 234,178

[52] U.S. Cl. .................................... 351/6; 351/12
[51] Int. Cl. .............................................. A61b 3/12
[58] Field of Search ................ 351/6, 16, 12, 13, 14

[56] References Cited
UNITED STATES PATENTS

| | | | |
|---|---|---|---|
| 1,776,960 | 9/1930 | Turville et al. | 351/12 |
| 3,269,792 | 8/1966 | Mirsky | 351/23 |
| 3,501,228 | 3/1970 | Speelman | 351/6 X |
| 3,533,685 | 10/1970 | Littmann et al. | 351/16 X |
| 3,698,099 | 10/1972 | Matsura | 351/7 X |

OTHER PUBLICATIONS

The Optician, Vol. CXXIV, Issue 3211, p. 337, Oct. 17, 1952, (351/12), "The Pantoscope."
The Optician, Vol. 152, No. 3945, p. 479-480, 11-11-66, "A New Ophthalmoscope," (351/6).
Bausch & Lomb Optical Co., Scientific & Tech. Pub., "Large Gullstrand Ophthal....effect,"12/1915,(351/6).

Primary Examiner—Paul A. Sacher
Attorney, Agent, or Firm—Browdy and Neimark

[57] ABSTRACT

The invention relates to a hand-instrument serving the purpose of direct and indirect ophthalmoscopy. One part of the instrument, which may be used alone, is a direct ophthalmoscope; it comprises — in contradistinction to known instruments of this kind — a reflecting means, such as a mirror or a prism which is vertically movable. The other part is an attachment for indirect ophthalmoscopy.

8 Claims, 5 Drawing Figures

PATENTED MAY 6 1975

3,881,812

MANUALLY HELD INDIRECT OPHTHALMOSCOPE ESPECIALLY ADAPTED FOR VIEWING THE PERIPHERY OF THE FUNDUS OCULI

BACKGROUND OF THE INVENTION

The conventional method of indirect ophthalmoscopy is a tedious procedure. Only three accessories are necessary: a lamp, a mirror, and a convex lens, but the proper use of these parts is rather complicated and requires skill on the part of the observer. The light must be appropriately positioned with regard to the patient's eye; the mirror must be inclined at the proper angle; the lens is to be held at a definite distance from the examined eye and tilted so as to exclude reflexes; it must be stable in the observer's hand, and to this purpose he rests some fingers of the same hand upon the patient's forehead, the patient's gaze should be properly directed; and finally, there should be an adequate distance between the examiner and the patient. A small change in the delicate equilibrium between all these factors occuring during the examination causes the fundus picture to disappear suddenly and the examiner has to peep around to see what happened. If despite all these drawbacks the method is widely used, it is because it has some important advantages to its credit: a more panoramic view of the fundus (one can see the disc and the macula in the same picture), better visibility of the fundus through hazy media, high efficiency in gross refractive errors, and possibility to see the far periphery, almost to the ora serrata. The instrument to be described aims to simplify the technique by assembling adequately all components in one efficient and easy to handle unit.

BRIEF SUMMARY OF DESCRIPTION

A direct ophthalmoscope of conventional type is provided with a vertically movable mirror. It also comprises a light source, condensing lenses, three interchangeable stops, two filters, a projecting lens, and an array of small lenses on two revolving discs filling a dioptric range from −49 to +30 D. The special feature consists in the vertical movability of the mirror. The attachment comprises: magnifying lenses, a system for viewing the fundus periphery, a fixation target, a system for seeing the patient's eye and a demonstration mirror.

BRIEF DESCRIPTION OF DRAWING

FIGS. 2 and 3 and 4 are details of the attachment, while

Figure 1:
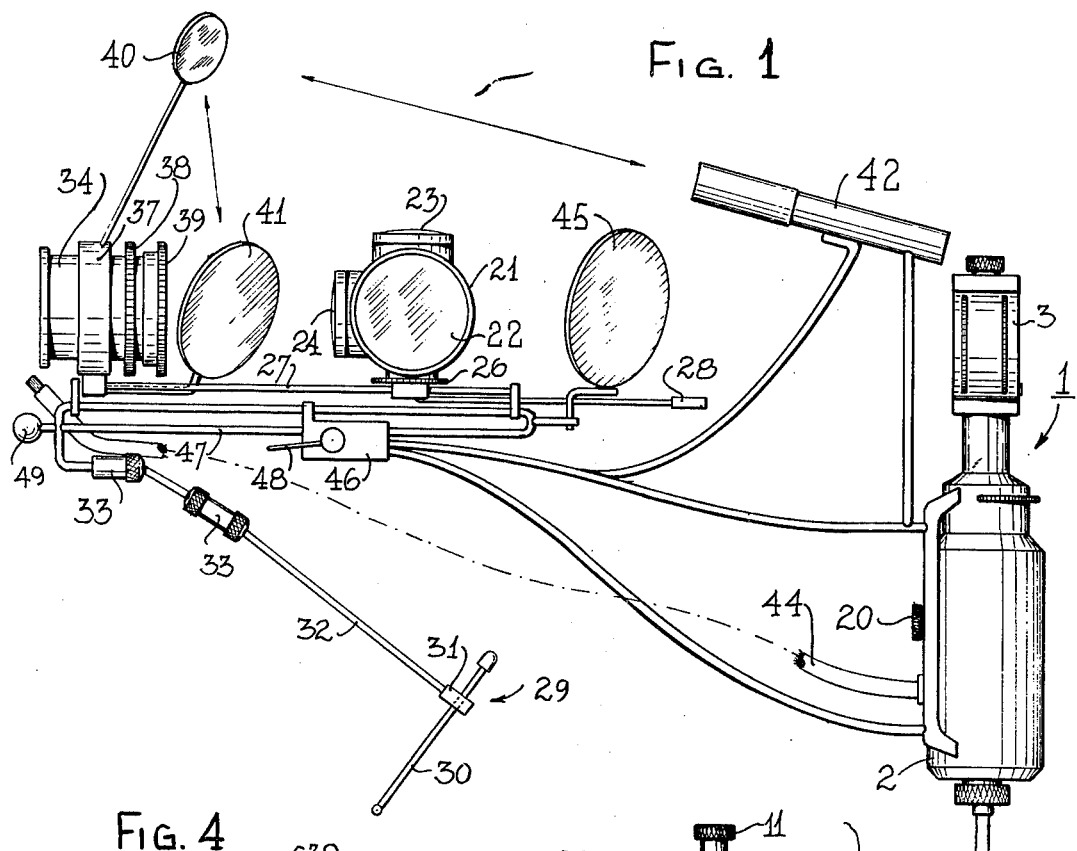
FIG. 1 of the drawing illustrates schematically the complete new ophthalmoscope in working position.

This ophthalmoscope shown at the right hand side of FIG. 1 is indicated as a whole by the numeral 1. It comprises a tubular housing 2 adapted to be held in the physician's hand, and a head portion 3 through which be observes the eye of the patient which he examines. In the tubular portion there are provided a light source, conventional condensing lenses, and a rotable disc having a plurality of color filter openings for varying the color of the light beam.

Figure 5:
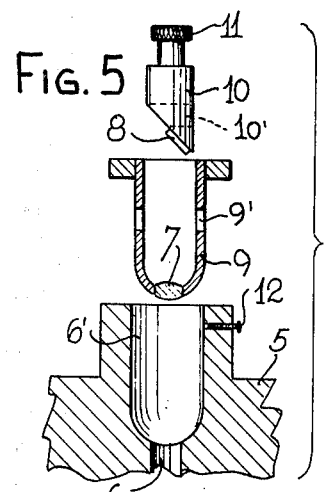
FIG. 5 illustrates the novel feature embodied in the direct ophthalmoscope.
Figure 2:
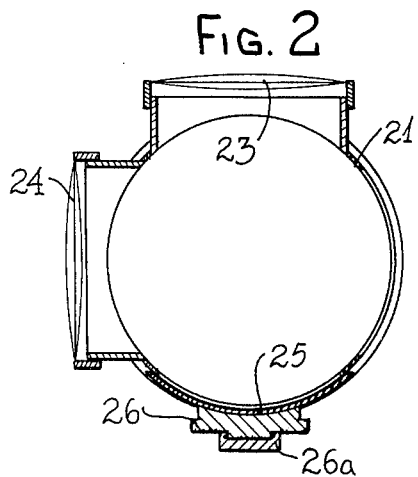
Figure 3:
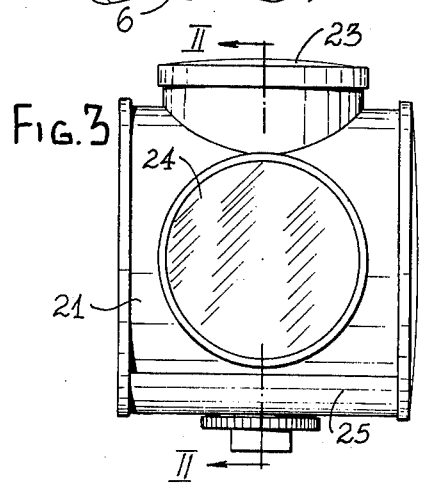

The novel features of the ophthalmoscope are shown in a fractional, sectional view in FIG. 5. The head portion 3 comprises a block member 5 having a bore 6 for the passage of the light beam to the projecting lens 7 and the mirror 8. In block 5 is also provided a slot 6'. The said cavity is adapted to receive a tubular member 9 which carries the projecting lens 7 at its lower end. In member 9 are provided two diametrically disposed holes 9' through which passes the line of observation. A rod 10 is disposed within member 9. This rod carries the mirror 8. The mirror is mouted at 45° in relation to the projecting lens 7. A slot 10' is provided in rod 10. It is in line with holes 9'. The rod 10 is glidable within the tube 9 and carries a head knob 11 at the upper end for facilitating its operation. The tube 9 may be fixed in position within the block member 5 by a screw 12.

The light source within the tubular housing 2 of the ophthalmoscope is concentrated by lens 7 into a very narrow spot thereon just below its upper edge to be reflected by 90° towards the observer eye. The latter mirror is movable vertically within the housing, its path of movement being constrained to an axis perpendicular to the line of sight through observation holes 9'. In the "up" position of mirror 8, its upper edge cuts the upper part of the observation holes 9'. In this position of the mirror, the line of sight of the observer through the observation holes 9' is just above the upper edge of the mirror and substantially coincides with (or is slightly above) the light beam reflected by the mirror. In the "down" position of the mirror, its upper edge cuts the lower part of observation holes 9'. In this position, the line of sight through the holes 9' is much above the upper edge of the mirror and distant from the light beam reflected by the mirror, which enters the observed eye through the lower part of the pupil.

It will thus be seen that constraining the movement of mirror 8 to an axis perpendicular to the line of sight, enabled the light beam to be raised or lowered with respect to the line of sight, while keeping the light beam parallel thereto. This arrangement serves a twofold purpose: it allows the observation of the macular region through a small pupil, and it achieves a separation between the observation and illumination lines, for indirect ophthalmoscopy particularly, according to Gullstrand. The mirror is moved up and downwards by means of the knob 11. Small spring biased balls (not shown) fixedly hold the rod 10 in the two extreme positions.

The attachment is a light structure secured to the body of the direct ophthalmoscope by means of a screw 20. It supports several parts:

1. A short horizontal tube 21 bearing three convex lenses 22, 23 and 24. Lens 22 has a diameter of 45 mm., lenses 23 and 24 are 35 mm. in diameter. The tube can be rotated both around its own axis (by 90°) and turned around a vertical curved plate 25 and movable up on a small flat support 26a. In this way one can choose one of the lenses and put in in its proper, anterior or posterior, position. To this purpose, spring biased balls and appropriate small hollows are provided in the tube and the plates. The support 26a is glidable upon a double track 27 and thus the lenses may be moved forth and back and brought to the proper distance from the eye. This gliding movement is performed by means of the handle 28 connected to the support.

2. An adjustable fixation target 29. It consists of a beta-light glowing green in the darkness. It is fixed on a short rod 30 supported by a sleeve 31 which is rotatable around the end of another longer rod 32. Rod 32 is connected to the foremost part of the instrument by means of two ball-joints 33. The described arrangement assures the maximal movability of the target in wide arcs in different directions on either side of the instrument. The gaze of the patient being properly directed, the target may be left alone and it stays firmly in the chosen position.

Figure 4:
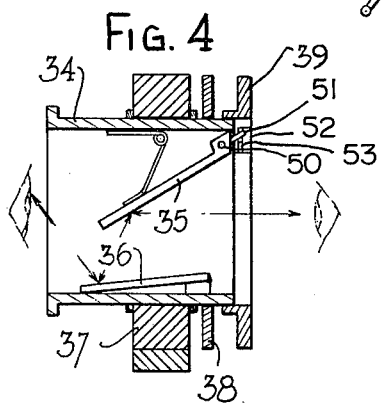

3. Part 34 is for examining the periphery of the fundus. This is a tubular housing containing two plane mirrors arranged in such a manner that a ray from the fundus periphery is first reflected from one mirror and then from the other to run parallel with the observation line into the pupil of the observer (FIG. 4). Likewise, the light beam from the ophthalmoscope is reflected by the mirrors to run an identical but reversed path and impinge on the fundus periphery. One of the mirrors is fixed while the other has a variable angle of inclination and by this more or less peripheral parts of the fundus may be rendered visible. The latter mirror may also be opened completely and in this case the viewing line is unobstructed by it, part 34 is quasi eliminated and the observer sees the usual ophthalmoscopic field. Part 34 is mounted inside a support 37 fixed to the chassis and may be rotated clock-and anticlockwise by 360° so that the different peripheral regions are seen in succession all around. The rotation is effected by means of the knurled ring 38 fixed upon tube 34. Another knurled ring 39 is freely mounted upon the terminal part of tube 34. Its rotation by a few degrees upon tube 34 activates the movable mirror 35. As shown particularly in FIG. 4, the posterior edge of the mirror 35 is hinged at the pivot 50 and is provided with a short arm 51. When the ring 39 is rotated, this short arm 51 is displaced causing the mirror 35 to pivot either downwardly or upwardly about the pivot 50 depending upon the direction of rotation of ring 39. This rotation of ring 39 has a limited excursion and at the end positions thereof the mirror is either completely up or completely down. When part 34 is rotated, ring 39 rotates with it; for rotating ring 39 alone, tube 34 has to be immobilized. Thanks to ring 39 the inclination of the movable mirror may be changed in any angular position of tube 34.

4. 40 is a plane mirror supported by a rod fixed to part 37. 41 is a semi-transparent mirror equally fixed to part 37 by means of a short rod. The inclination of each of the mirrors is permanently adjusted in such a manner that the mirrors form a periscopic unit enabling the observer to see the examined eye, which he can not do through the magnifying lenses. The image of the eye is reflected by mirror 41 towards mirror 40. Unit 42 is a small telescope directed toward mirror 40. The ocular ending of the telescope is in such a position that the observer examining the fundus through the viewing hole of the ophthalmoscope has only to raise his eye insignificantly in order to see, magnified by the telescope, the eye itself with its surroundings. This is very useful when the fundus picture disappears all of a sudden, because the light beam has been caused inadvertantly to deviate from its path and leave the patient's pupil, and the observer has to readjust the ophthalmoscope. Looking instinctively through the telescope he sees then that the patient's pupil is black, and that a small bright spot of light is somewhere in the neighbourhood; he moves a little his instrument so as to make the tiny light spot reenter the pupil, and behold: the pupil is instantly aglow again and the fundus picture reappears at the same moment. Parts 40, 41 and 42 constitute together, what may be termed a "Teleperiscope."

5. Naturally, the ocular area must be sufficiently illuminated if it is to be seen through the telescope. The narrow beam serving to illuminate the fundus does not contribute to this effect being concentrated to a small spot in the pupillary area. Part 44 is a fiber optics flexible chord transferring the necessary light from the source to the eye region.

6. Mirror 45 is a semi-transparent mirror enabling an assistant to see the fundus together with the main observer. When not in use, it can be turned aside.

7. The overall length of the instrument may be adjusted at will. The posterior part of the chassis fanning out from sleeve 46 is glidable with this sleeve on a track 47 with respect to the rest. The instrument is shortest when sleeve 46 is at the anterior end. Lever 48 locks the sleeve in any desired position. The shortening of the instrument is useful for storage and when the observer desires to reduce his distance from the patient in order to see details in strong magnification.

8. The small sphere 49 is a rest. It is applied to the face of the patient below the lower orbital ridge.

The preceding description is an ideological outlay rather than a definite embodiment. This is left to the inventiveness of the constructors who may be relied upon to find the best practical modality.

Four possible improvements, while not illustrated, may be shortly outlined.

1. The knurled rings 38 and 39 may be, both together or each alone, rotated from a distance by the index finger of the hand holding the ophthalmoscope.

2. A pointer may be added for indicating details of the fundus to the co-observer, placed in the path of the light beam it will cast a shadow onto the retina at the proper spot.

3. For using the instrument during an operation, it may be desirable to have more space between part 34 and the patient's eye. To this end, sphere 49 may be made to protrude more or less, being attached to the end of a glidable rod. The overall length of the instrument will be maintained by moving anteriorly sleeve 46.

4. The fundus may be seen in an upright picture by either observer by using an additional lens or mirror respectively.

After the instrument has been described in detail, its advantages are apparent. All the drawbacks of indirect ophthalmoscopy connected with the elementary technique are avoided. One hand assembles all ingredients necessary for the examination, the other hand is free. The light source, the mirror, the magnifying lens, are properly directed. and at the proper distances. The distance between patient and observer is fixed and the direction of gaze of the former is exactly adjusted and stable. There is a possibility of viewing the far periphery of the fundus all around while the patient and the doctor stay in a normal face-to-face sitting position and don't have to assume awkward attitudes. There is a good control of centration by actually seeing the patient's eye quasi simultaneously with the fundus. Possibility of demonstration of fundus details by means of a pointer. The instrument is versatile, it can be used for direct and indirect ophthalmoscopy. It is light enough —460 g. — which makes it a portable instrument.

The described indirect ophthalmoscope compares advantageously with the binocular ophthalmoscope. The latter is head-born which is a physical inconvenience. The light has to be centered by means of the head which must assume unnatural constrained positions. The observer has to maneuver a hand-held magnifying lens, which brings us back to the classical primitive method. As to the binocularity advantage, this does not seem to be essential: in big detachments it is not necessary, and small differences of level do not produce a substantial stereoscopic effect. In fact, binocularity is often an unsurmountable difficulty deterring doctors from the use of this instrument. But if desired, it can be attained without much difficulty in the described hand-ophthalmoscope by using a prismatic supplement. Other developments are equally possible, such as adapting a camera for fundus photography. The instrument has been used successfully for fundus television.

What is claimed is:

1. An indirect ophthalmoscope comprising:
a tubular portion to be held in the physician's hand containing a light source for projecting a beam of light;
a head portion attached to said tubular portion containing an observation hole through which the eye of the patient is examined and a movable reflecting means for reflecting the light beam from the light source into the eye of the patient being examined, the path of movement of said reflecting means being constrained to a rectilinear path perpendicular to the line of sight of the physician to the eye of the patient, said movement not affecting the direction and angular inclination of the projected light rays which remain parallel to the line of sight;
an attachment means secured at one end to said tubular portion, the opposite end being free for resting on the face of the patient to be examined;
a track disposed upon said attachment means;
a convex lens disposed in said line of sight for viewing the fundus of the examined eye, said convex lens being movable on said track along the long of sight; and,
mirror means positioned between the free end portion of said attachment means and said convex lens for receiving the reflected light from the periphery of the fundus and for transmitting said reflected light along said line of sight.

2. An ophthalmoscope according to claim 1, wherein said attachment means contains a lens holder, positioned between said tubular portion and said means for examining the periphery of the eye, having a plurality of convex lenses selectively positionable in said line of sight.

3. An ophthalmoscope according to claim 1, wherein said attachment means contains a fixation target positioned under the means for examining the periphery of the eye.

4. An ophthalmoscope according to claim 3, wherein said fixation target is movable to a plurality of positions.

5. An ophthalmoscope according to claim 1, wherein said means for examining the periphery of the fundus comprises two plane mirrors.

6. An ophthalmoscope according to claim 5, wherein one of said plane mirrors is movably mounted so that its inclination may be varied with respect to the other plane mirror.

7. An ophthalmoscope according to claim 1, wherein said attachment means further carries a teleperiscopic unit enabling the observer to see the whole of the examined eye and its surroundings, said teleperiscopic unit comprising a semi-transparent mirror affixed to said extension between the examined eye and said convex lens, a plane mirror affixed to said fundus examining means, and a telescope, the ocular of which being adjacent to said observation hole, said transparent mirror reflecting the eye image to the plane mirror, said plane mirror reflecting the eye image to said telescope.

8. An ophthalmoscope according to claim 1, for enabling the fundus of the eye to be examined by an assistant or observer, wherein said attachment means carries a semi-transparent mirror disposed in said line of sight between the said head portion and said convex lens and oriented to reflect the said fundus image of the examined eye to the eye of the assistant or observer.

* * * * *